United States Patent
Weaver et al.

(10) Patent No.: US 8,342,203 B2
(45) Date of Patent: Jan. 1, 2013

(54) PRESSURE RELIEF VALVE

(75) Inventors: Neil Weaver, Woodinville, WA (US);
Josef Lombardi, Bothell, WA (US);
Cassady Laton, Seattle, WA (US);
Barry Korthuis, Castle Rock, CO (US);
William Walters, Allentown, PA (US)

(73) Assignee: Pacific Bag, Inc., Woodinville, WA (US)

( * ) Notice: Subject to any disclaimer, the term of this patent is extended or adjusted under 35 U.S.C. 154(b) by 0 days.

(21) Appl. No.: 13/347,693

(22) Filed: Jan. 10, 2012

(65) Prior Publication Data
US 2012/0103983 A1    May 3, 2012

Related U.S. Application Data

(63) Continuation of application No. 11/366,116, filed on Mar. 2, 2006.

(51) Int. Cl.
*F16K 15/14*   (2006.01)
*F16K 17/12*   (2006.01)
*F16K 21/04*   (2006.01)
*B65D 33/01*   (2006.01)

(52) U.S. Cl. .................. 137/533.17; 137/843; 251/333; 251/359; 383/103

(58) Field of Classification Search ............ 137/533.17, 137/533, 843, 533.19, 225; 251/333, 359; 383/103
See application file for complete search history.

(56) References Cited

U.S. PATENT DOCUMENTS

| | | | | |
|---|---|---|---|---|
| 1,251,758 | A * | 1/1918 | Dayton | 137/223 |
| 3,277,830 | A * | 10/1966 | Kalert, Jr. et al. | 417/395 |
| 3,591,138 | A * | 7/1971 | Wolfe | 251/333 |
| 4,420,015 | A | 12/1983 | Blaser | |
| 5,093,047 | A | 3/1992 | Zeppenfeld | |
| 5,584,409 | A | 12/1996 | Chemberlen | |
| 5,992,442 | A * | 11/1999 | Urquhart et al. | 137/246 |
| 6,776,301 | B2 | 8/2004 | Torres-White et al. | |
| 6,827,105 | B1 | 12/2004 | Marble et al. | |
| 6,827,492 | B2 | 12/2004 | Cook | |
| 7,178,550 | B2 * | 2/2007 | Stotkiewitz et al. | 137/246 |
| 7,721,752 | B2 * | 5/2010 | Stotkiewitz et al. | 137/246 |
| 2010/0187230 | A1 | 7/2010 | Beer et al. | |

* cited by examiner

*Primary Examiner* — John Rivell
*Assistant Examiner* — Atif Chaudry
(74) *Attorney, Agent, or Firm* — Patrick M Dwyer

(57) ABSTRACT

A degassing valve in a flexible container is disclosed. The valve includes a generally flat valve seat on a truncated generally dome shaped structure, and the valve seat is raised a height above the valve chamber base surface. A resilient, non-perforated, non-spring-biased diaphragm is inter-engaged upon the valve seat and overlaps the valve seat outer periphery. The valve seat engages a central area of the diaphragm that is not proximate the perimeter of the diaphragm, and the dome shaped structure has a sectional radius greater than the diaphragm radius. A well is recessed into the valve seat in a direction away from the diaphragm by a depth less than the height of the valve seat above the valve chamber base surface.

9 Claims, 4 Drawing Sheets

PRESSURE RELIEF VALVE

This application is a Continuation of U.S. patent application Ser. No. 11/366,116 filed Mar. 2, 2006.

TECHNICAL FIELD

The disclosed apparatus relates to an apparatus for a pressure relief valve, more particularly a pressure relief valve for use with flexible containers, and further more particularly, a pressure relief valve for use with flexible bags holding gas emitting substances.

BACKGROUND OF THE INVENTION

Pressure relief valves of this type are used to allow gases to escape from the interior of a flexible container as gas pressure builds, or is emitted from the packaged substance, without allowing the packaged material to leak out of the container, nor outside gas or moisture to enter the container in the process. Existing designs for pressure relief valves of this type are many and varied, but conform to the basic structure of a valve body shaped to provide a valve chamber with a valve floor or seat that provides an opening or openings into the container, combined with a resilient diaphragm resting within the valve chamber that acts as a flap or plug covering the opening or openings. As gases build up and escape, the diaphragm is lifted from the openings, but returns resiliently to cover the openings when the pressure has been relieved. To retain the diaphragm within the valve chamber during the process, some existing designs use various methods of pinning or clamping some portion of the diaphragm to the valve chamber walls, seat or ceiling, or a post running from the valve chamber seat or ceiling through the diaphragm itself, while other designs have retaining posts mounted on the side walls of the chamber to retain a floating diaphragm. Diaphragms which are clamped peripherally to the chamber seat are usually constructed with openings or perforations, or are made of a permeable material to allow the gases to pass through the diaphragm itself. The valve chamber and diaphragm are generally coated with a viscous liquid to aid in the seal.

Existing designs for pressure relief valves of this type perform to a certain standard, but at times still allow gases to bloat the flexible containers to unsightly or dangerous proportions, or still allow reverse flow of air or moisture back into the container. A simple and economically viable pressure relief valve with a performance edge over conventional valves is needed.

DISCLOSURE OF THE INVENTION

The disclosed apparatus is a pressure relief valve that has proved surprisingly effective in relieving gases that build up within a flexible container. A novel valve seat is disclosed, the valve seat shaped such that at least a part of the diaphragm is not engaged by the valve seat. Advantageously, the diaphragm is larger than, or overlaps, the available seating (diaphragm engaging) area of the valve seat.

The pressure relief valve disclosed comprises a valve body with an inner valve chamber, the valve seat within the chamber having a gas passage port or ports from an area outside of the chamber to the inside of the chamber. For instance, in one embodiment built up gas passes from the interior of a flexible container from which gas pressure must be relieved through the valve to the atmosphere outside the flexible container.

A resilient diaphragm floats within the valve chamber. The diaphragm is seated upon, and inter-engaged with, the valve seat such that when interior gases are below a threshold pressure the diaphragm is engaged and effectively plugs the gas port or ports. When the interior pressure increases above the threshold pressure, at least a portion of the diaphragm is disengaged from the seat by the increased pressure, allowing the gases to pass through the gas port(s) and around the diaphragm. After the interior pressure is thus relieved, the resilient diaphragm resumes its former position and again plugs the gas port or ports. This seated, resiliently sealable and unsealable interaction between the diaphragm and valve seat is what is meant in this application by the term "inter-engaged".

A preferred valve seat is shaped with a generally flat diaphragm-engaging surface such that this diaphragm engaging surface engages the diaphragm in a central area of the valve chamber. The valve seat also has at least one surface that does not generally engage the diaphragm, preferably in an outer or peripheral portion of the valve seat. Advantageously, the surface area of the diaphragm engaging surface of the valve seat is less than the surface area of the engaging side of the diaphragm. The diaphragm-engaging surface of the valve seat is preferably inter-engaged with a central area of the diaphragm, generally not proximate any perimeter of the diaphragm.

For example in one embodiment, the valve seat is dome shaped with the top of the dome truncated or sliced off. This creates a generally flat surface on the top of the dome with the dome-like sides sloping away from, and generally not engaging, the diaphragm. In this embodiment, the generally flat surface at the top of the dome and the diaphragm are both generally circular in shape and the center point of these circular surfaces are roughly aligned such that the central area of the diaphragm and the central area of the valve seat are inter-engaged. The diaphragm floats freely above the generally flat top of the dome, not in any significant way clamped, pinched or held against the truncated dome-shaped valve seat. Nor is the diaphragm perforated by any portion of the valve seat. In this embodiment, the generally flat truncated surface of the dome-shaped valve seat is the diaphragm engaging surface. When the diaphragm is in a sealing position, in contact with the valve seat and seated upon the generally flat surface, the edges of the diaphragm overlap the surface of the dome that slopes away, but are not resting against it. Therefore, the surface of the dome that slopes away, all around the perimeter of the valve seat, is the non-engaging surface referred to above.

The diaphragm engaging surface of the valve seat is advantageously within the range of 16% to 80% of the surface area of the engaging side of the diaphragm. In one embodiment, the diaphragm engaging surface of the valve seat is within the range of 40% to 55% of the surface area of that side of the diaphragm.

The valve body is advantageously a single piece of material with one surface of the valve chamber being defined by the surface of the flexible container. This surface would be the surface in the chamber opposite the valve seat, and might be looked at as the "valve ceiling". In a preferred embodiment, this surface is the inner surface of the flexible container, with suitable perforation(s), obviating the need for additional parts to be manufactured for the valve.

In one embodiment, the valve chamber walls have at least one retaining post. The post or posts are situated such that the diaphragm floats freely within the valve chamber and is not clamped, pinned or held against any surface of the valve chamber; nor is the diaphragm perforated by any protuberances in the valve chamber. The retaining posts enable the diaphragm to continue to float freely in the valve chamber and not leave the chamber or inter-engage with the surface of the flexible container or "valve ceiling".

As described above, one embodiment of the valve seat is a truncated dome shape that is inter-engaged with a generally circular shaped diaphragm, in which the truncated surface of the truncated dome is the diaphragm engaging surface of the valve seat. It is advantageous that the diaphragm engaging surface be within the range of 40% to 55% of the surface area of the engaging side of the diaphragm. As to the shape of the valve seat area that does not inter-engage the diaphragm, the dome is preferably convex relative to the diaphragm and it is advantageous if the dome shape is such that it is described by a radius in the range of 2.5-4 times the radius of the diaphragm, though a radius in the range of 1-5 times the radius of the diaphragm is effective as well.

An alternative embodiment is a valve seat with a frustoconical shape having a generally flat surface at the top of the cone. This is similar to the dome shaped valve seat disclosed above, except that the sides sloping away from the truncated flat surface are not a curved slope as in the dome shape, but a generally linear slope. The generally flat, truncated surface is the surface that inter-engages the diaphragm. The diaphragm can be in a sealing position, in contact with the valve seat and laying over this generally flat surface, and, because the diaphragm is resilient, it does not necessarily touch the sides of the frustoconical shape that slope away. Therefore, the surface area of the sides of the frustoconically shaped valve seat that slope away are the surface area that does not generally engage the diaphragm.

In another embodiment, the valve seat's surface has a generally flat central portion with a channel shaped portion proximate the perimeter of the surface of the valve seat. This channel can be straight sided or curved sided, the important feature being that this portion of the surface of the valve seat slopes away from the diaphragm when it is in a sealing position in contact with the valve seat, thereby not inter-engaging with the diaphragm, while the central generally flat portion does inter-engage.

The embodiments described above do not require that the valve seat and diaphragm always be circular or even symmetrical in shape. The improved performance of the disclosed valve is still available, as long as the diaphragm presents an engaging surface, part of which inter-engages a generally flat surface of the valve seat, and as long as this surface of the diaphragm is larger than the engaging surface of the valve seat. The perimeters of the valve and diaphragm may be square, triangular, rectangular, ovoid, polygonal or of irregularly curving shapes, and so also may the inter-engaging surface area of the valve seat either be symmetrical or asymmetrical or even ridged. The non-engaging surface of the valve seat does not have to be contiguous with itself; it could have sections extending from the generally central inter-engaging area to the perimeter of the valve seat. The inter-engaging area of the valve seat surface need only be of a smaller area than the surface area of the side of the diaphragm with which it inter-engages, with the diaphragm overlapping some portion of the valve seat surface that does not generally inter-engage the diaphragm.

For example, in one embodiment the diaphragm engaging surface of the valve seat consists of a circular central portion as described in various embodiments above. The portion of the valve seat that is proximate the perimeter of the diaphragm is not uniformly non-engaging however. At selectable intervals, the valve seat slopes away from the diaphragm while in between these intervals the valve seat surface does not angle away from the diaphragm, thereby remaining inter-engaging.

In yet another embodiment, an entire one half portion (for example) of a circular valve seat surface is available to inter-engage the diaphragm, while around the perimeter of the other half circle, the surface of the valve seat slopes away from the diaphragm in a curving or linear slope as described above. While the diaphragm overlaps the surfaces of the valve seat that slope away, it does not generally inter-engage with these surfaces.

In any embodiment a well may be provided in the valve seat, the well being recessed away from the diaphragm into the valve seat. Preferably, the center of the well and the center of the diaphragm are generally aligned. In order to retain an effective area of diaphragm inter-engaging surface of the valve seat, the perimeter of the well is less than the perimeter of the diaphragm engaging surface of the valve seat. This allows for a ring (or any shape of area outside the perimeter of the well, but inside the perimeter of the diaphragm engaging surface) to inter-engage the diaphragm. The perimeter of the well and the perimeter of the diaphragm engaging surface of the valve seat can be adjusted to increase or decrease the area of valve seat that actually is available to inter-engage the diaphragm. For example, if the perimeter of the well is very small and the perimeter of the diaphragm engaging surface of the valve seat is nearly that of the perimeter of the diaphragm, the area of the valve seat that inter-engages the diaphragm approaches the area of the diaphragm. On the other end of the spectrum, if the perimeter of the well is nearly that of the perimeter of the diaphragm engaging surface of the valve seat, the area of the valve seat that inter-engages the diaphragm is much smaller. For embodiments with a well in the valve seat, an effective size for the area of the valve seat that inter-engages the diaphragm is in the range of 5% to 60% of the surface area of the engaging side of the diaphragm, while an advantageous range is 9% to 40% of the surface area of the engaging side of the diaphragm.

BEST MODE OF CARRYING OUT THE INVENTION

Figure 1:
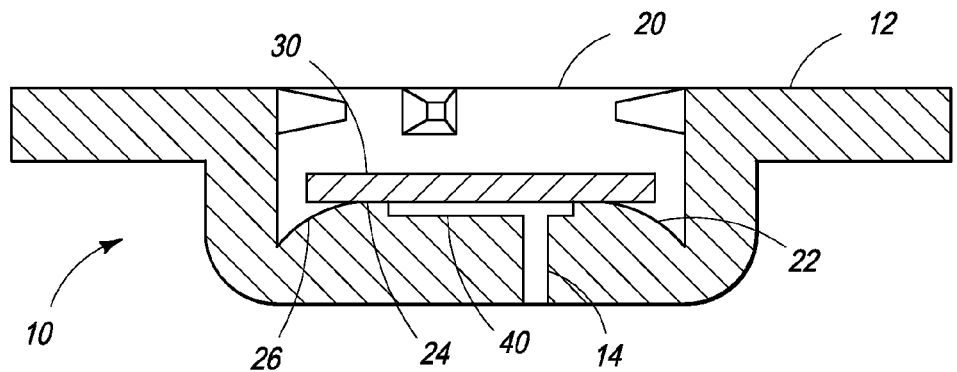
FIG. 1 is a schematic sectional side view of a pressure relief valve, taken along line 1-1 of FIG. 2.

As used in this application, "generally flat" means effectively planar, with only insubstantial surface variations or none at all. "Effectively planar" generally means, with respect to the diaphragm inter-engagement, that the diaphragm effectively seals, given its resilient characteristics, against the generally flat or effectively planar surface.

Turning now to the drawings, the various embodiments will be described by reference to the numerals of the drawing figures wherein like numbers indicate like parts.

Figure 2:
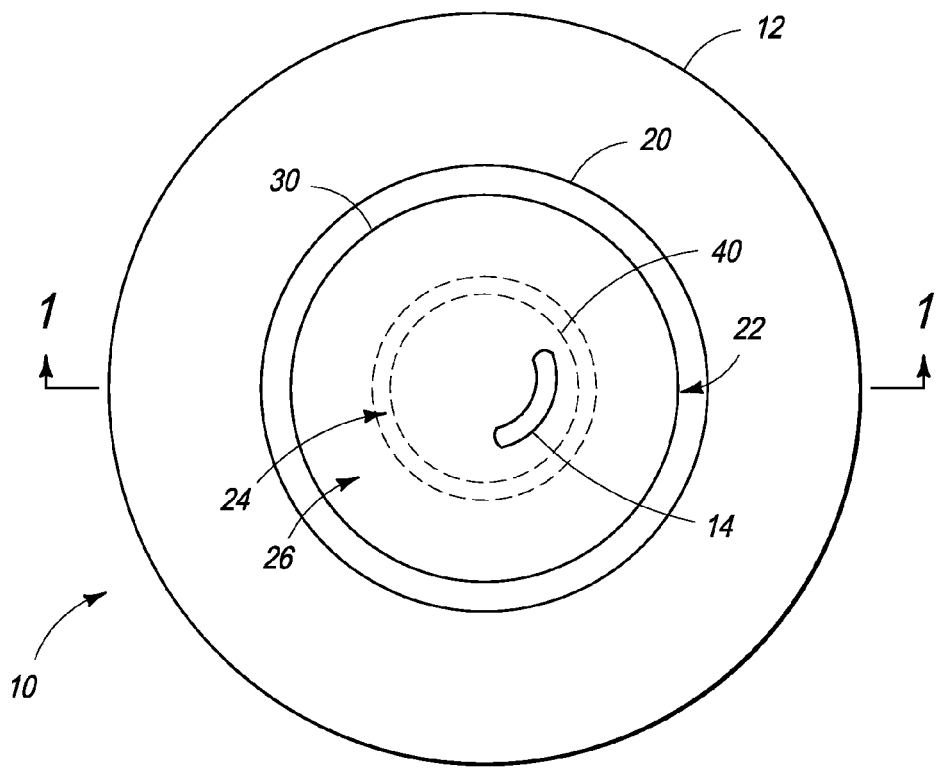
FIG. 2 is a schematic plan view of a pressure relief valve.

FIG. 1 is a schematic sectional side view of a preferred embodiment of the pressure relief valve 10, taken along line 1-1 of FIG. 2. A valve body 12 comprises an inner valve chamber 20 and a valve seat 22 within chamber 20 having an inlet gas port 14 to the area outside valve chamber 20. In one embodiment, the area outside of valve chamber 20 is the interior of a flexible container from which gas pressure must be relieved. A resilient diaphragm 30, the thickness of which is exaggerated in FIG. 1 for clarity, floats within valve chamber 20. Diaphragm 30 is inter-engaged with valve seat 22 such that when gas pressure inside the container is less than atmospheric pressure diaphragm 30 is engaged and plugs or seals gas port 14. When the pressure increases above a selected threshold above atmospheric, escaping gases raise a portion of diaphragm 30 to disengage it from valve seat 22 allowing the gases to pass through gas port 14, passing between diaphragm 30 and valve seat surface 24, and around diaphragm 30 and exit valve 10 to the atmosphere. Valve seat 22 is shaped with a generally flat diaphragm-engaging surface 24, centrally positioned with respect to diaphragm 30, and a surface 26 that does not generally engage an outer or peripheral portion of diaphragm 30. In one embodiment, valve seat 22 is a truncated dome shape, surface 26 being convex relative to diaphragm 30.

FIG. 2 is a schematic plan view of a preferred embodiment of one piece pressure relief valve 10. Diaphragm 30 is inter-engaged with valve seat 22 such that diaphragm 30 desirably overlaps the generally flat portion of valve seat surface 24, diaphragm 30 covering inlet gas port 14. In this drawing, it can be seen that when the pressure within the container allows diaphragm 30 to be in contact with generally flat portion of the valve seat surface 24, inlet gas port 14 is plugged. When the pressure is increased to reach a critical pressure, at least a portion of diaphragm 30 is pushed free of generally flat surface 24 and gases pass through inlet gas port 14 and around diaphragm 30.

In preferred embodiments, a silicone oil of generally about 100 weight, as generally known in the art, is provided as a medium upon which the diaphragm can float. This oil is generally provided in the recessed well of the valve seat, though it is not restricted to the well. The preferred rubber for the diaphragm is generally around 50 durometer. Variances in diaphragm thickness are acceptable, at least in the range of +/−20%; a preferred diaphragm thickness is 0.031 inches+/−0.003. Disclosed embodiments have demonstrated as much as 20 mm of $H_2O$ difference between (valve) open and closed; for instance preferred embodiments open at about 38-45 mm and close at 14-20 mm $H_2O$. This is both much tighter and also more consistent than is believed to be achievable with existing relief valves. In a preferred valve body having an inner well diameter in the range of about 0.37 inches, with a preferred diaphragm diameter close to but not equal to that dimension, such as 0.355 inches+/−0.005, a preferred curvature (radius) of a cross-section of the walls of the preferred dome shape for the valve seat is around 0.5 inches, +/−5%, and more preferably 0.513 inches+/−0.005.

Figure 3A:
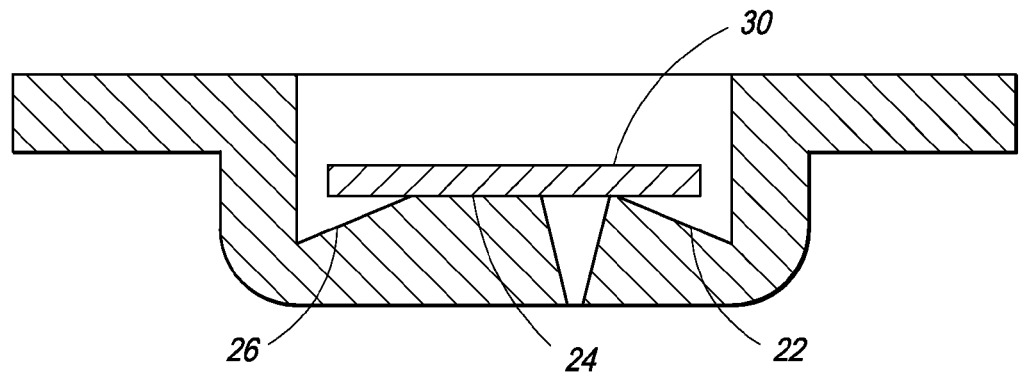
FIGS. 3a and 3b are schematic sectional side views of alternate embodiments of a pressure relief valve, taken along line 1-1 of FIG. 2.
Figure 3B:
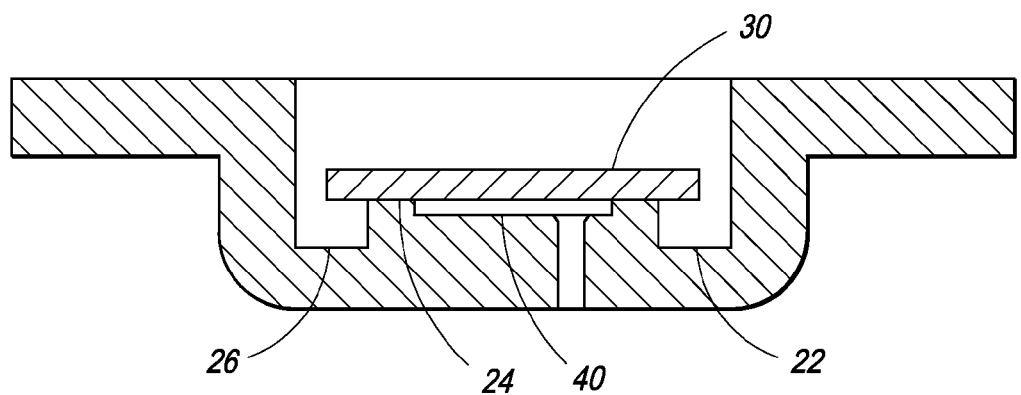

In FIGS. 3a and 3b, alternate embodiments of pressure relief valve 10 are illustrated. FIG. 3a illustrates a valve seat with a surface that is a truncated frustoconical shape. The generally flat portion of the valve seat surface 24, that is diaphragm-engaging, is the truncated surface of the frustoconical shape. Surface 26 that does not generally engage the outer portion of diaphragm 30, has a generally linear slope. This is different from the curved slope of the truncated dome embodiment of FIG. 1. FIG. 3b illustrates a valve seat with surface 26 that has a channel embedded proximate the perimeter of valve seat 22. The illustrated generally circular channel sectional profile is composed of generally steep or right angles, however, alternate embodiments may have channels of generally semicircular sectional profile or any other shape, provided that at least a portion of valve seat surface 26 is not generally inter-engagable with diaphragm 30.

Also illustrated in FIGS. 1, 2 and 3b is an optional component for all embodiments: a well 40, recessed, relative to diaphragm 30, into valve seat 22. Preferably, the center of well 40 and the center of diaphragm 30 are generally aligned. Advantageously, to assure a valve seat surface 24 that is inter-engaged with the diaphragm, the perimeter of well 40 is less than the perimeter of the diaphragm engaging surface 22.

Figure 4A:
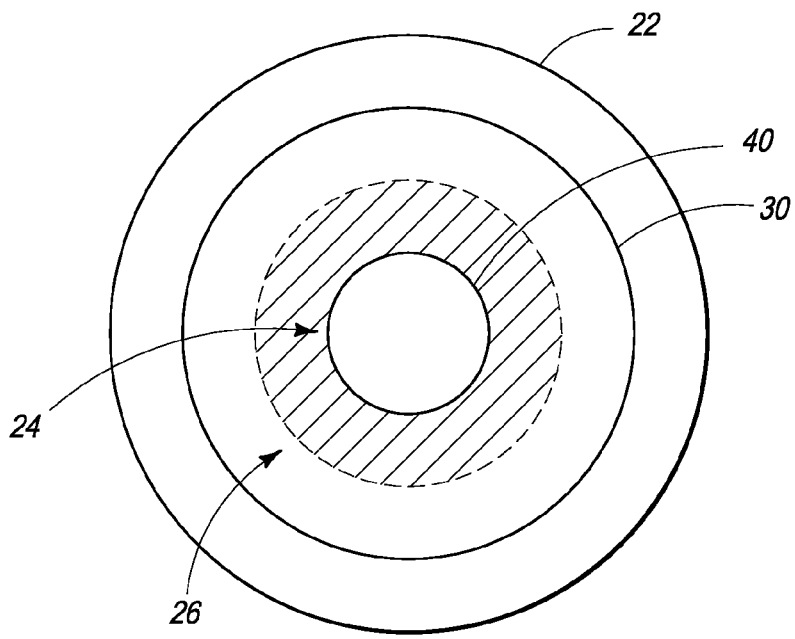
FIGS. 4a and 4b are schematic plan views of alternate embodiments of a pressure relief valve.
Figure 4B:
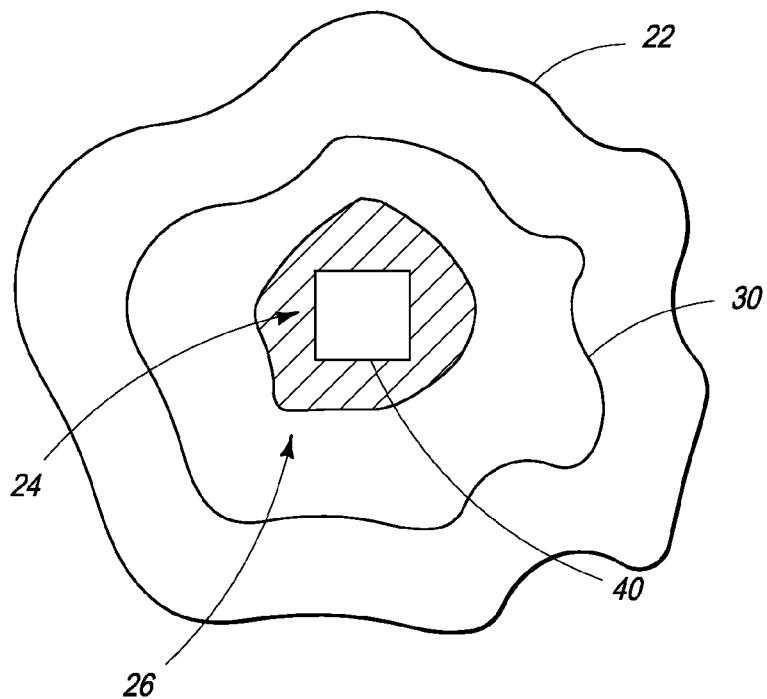

FIGS. 4a and 4b are schematic plan views of a valve seat 22 simplified for illustrative purposes. In both drawings, generally flat diaphragm-engaging surface 24 is shaded to illustrate the overlapping of diaphragm 30. Diaphragm 30 covers well 40 and generally flat diaphragm-engaging surface 24. In addition, it can be seen how diaphragm 30 partially overlaps surface 26 that does not generally engage an outer or peripheral portion of diaphragm 30. It can be seen that the shaded diaphragm engaging surface 24 of valve seat 22 is of a smaller surface area than the surface area of diaphragm 30's engaging side. FIG. 4b also illustrates that no particular shape of valve seat 22, diaphragm 30 or well 40 is required in order for diaphragm 30's engaging sides surface area to be larger than the surface area of diaphragm-engaging surface 24.

Figure 5A:
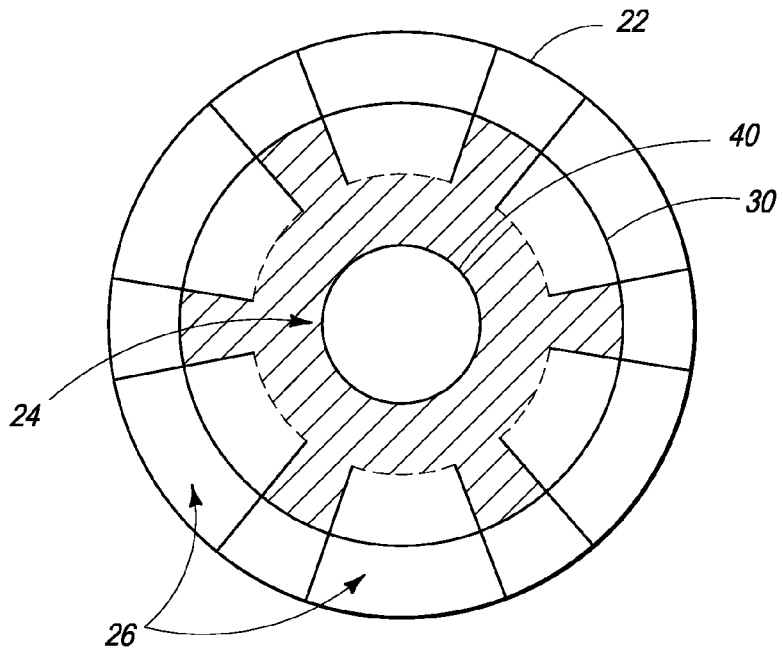
FIGS. 5a and 5b are schematic plan views of alternate embodiments of a pressure relief valve.
Figure 5B:
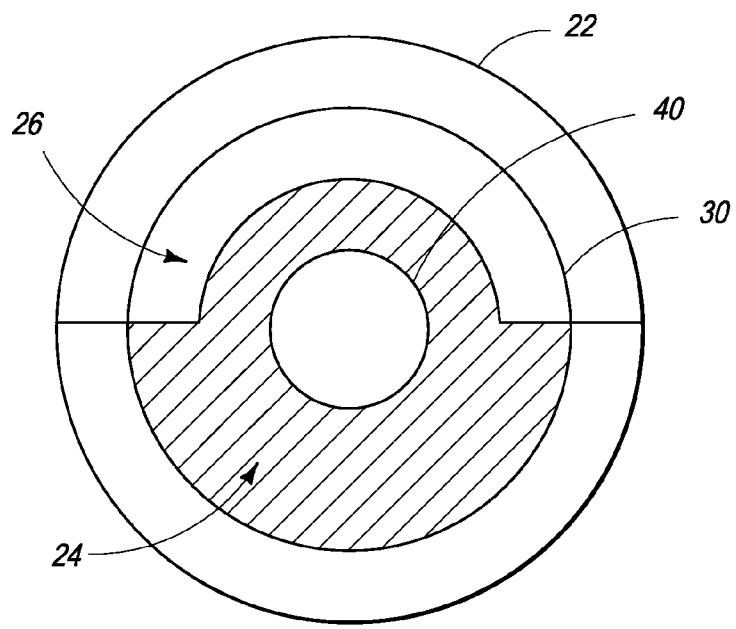

FIGS. 5a and 5b are also schematic plan views of a valve seat 22 and illustrate alternate shapes of diaphragm-engaging surface 24. In FIG. 5a diaphragm-engaging surface 24 is shaded to illustrate the overlapping of diaphragm 30. It can be seen that webs extend from the central generally flat surface of surface 24 to the perimeter of valve seat 22 which are more or less coplanar. Between these webs non-diaphragm engaging surface 26 slopes away from diaphragm 30, thus providing a surface area of diaphragm-engaging surface 24 that is smaller than the surface area of diaphragm 30's engaging side. Diaphragm 30 overlaps non-diaphragm engaging surface 26, but does not engage with it.

In FIG. 5b is illustrated an embodiment with a non symmetrical valve seat surface. Again, diaphragm-engaging surface 24 is shaded to illustrate the overlapping of diaphragm 30. It should be noted that where the diaphragm-engaging surface 24 extends to the edge of diaphragm 30 the surface of valve seat 22 continues more or less planarly to the perimeter of valve seat 22. Approximately one half of the valve seat is coplanar and available to engage diaphragm 30. However, on the opposite side of valve seat 22 non-diaphragm engaging surface 26 slopes away from diaphragm 30, thus providing a surface area of diaphragm-engaging surface 24 that is smaller than the surface area of diaphragm 30's engaging side. Diaphragm 30 overlaps non-diaphragm engaging surface 26, but does not engage with it.

With regard to systems and components above referred to, but not otherwise specified or described in detail herein, the workings and specifications of such systems and components and the manner in which they may be made or assembled or used, both cooperatively with each other and with the other elements of the disclosed apparatus described herein to effect the purposes herein disclosed, are all believed to be well within the knowledge of those skilled in the art. No concerted attempt to repeat here what is generally known to the artisan has therefore been made.

INDUSTRIAL APPLICABILITY

The novel shape of the valve seat in the disclosed apparatus has proved surprisingly effective in relieving gases that are building pressure within a flexible container, without also allowing atmospheric gas flow back into the container, in comparison with the previous art in the industry.

In compliance with the statute, the disclosed apparatus has been described in language more or less specific as to structural features. It is to be understood, however, that the disclosed apparatus is not limited to the specific features shown, since the means and construction shown comprise preferred forms of putting the disclosed apparatus into effect. The disclosed apparatus is, therefore, claimed in any of its forms or modifications within the legitimate and valid scope of the appended claims, appropriately interpreted in accordance with the doctrine of equivalents.

We claim:

1. A degassing valve for a flexible container, the valve comprising:
   a generally flat valve seat on a truncated generally dome shaped structure, the valve seat raised a height above a valve chamber base surface and having a valve seat outer periphery; and
   a resilient, flat, non-perforated diaphragm inter-engaged upon, but not mechanically held against, the valve seat and overlapping the valve seat outer periphery, the dome shaped structure having a sectional radius greater than the diaphragm radius, the diaphragm having a perimeter; such that the valve seat engages a central area of the diaphragm not proximate the perimeter of the diaphragm;
   the valve seat further comprising a well recessed a depth into the valve seat in a direction away from the diaphragm, the well being generally covered by the diaphragm when it is inter-engaged upon the valve seat, the depth of the well recess less than the height of the valve seat above the valve chamber base surface.

2. The degassing valve of claim 1 wherein the diaphragm is generally circular.

3. The degassing valve of claim 1 wherein the valve seat has a valve seat area and the diaphragm has a diaphragm area, and the valve seat area is 5-60% of the diaphragm area.

4. A flexible container and a degassing valve in a wall of the container, the valve comprising:
   a generally flat valve seat on a truncated generally dome shaped structure, the valve seat raised a height above a valve chamber base surface and having a valve seat outer periphery; and
   a resilient, flat, non-perforated diaphragm inter-engaged upon, but not mechanically held against, the valve seat and overlapping the valve seat outer periphery, the dome shaped structure having a sectional radius greater than the diaphragm radius, the diaphragm having a perimeter; such that the valve seat engages a central area of the diaphragm not proximate the perimeter of the diaphragm;
   the valve seat further comprising a well recessed a depth into the valve seat in a direction away from the diaphragm, the well being generally covered by the diaphragm when it is inter-engaged upon the valve seat, the depth of the well recess less than the height of the valve seat above the valve chamber base surface.

5. The container and valve of claim 4 wherein the diaphragm is generally circular.

6. The container and valve of claim 4 wherein the valve seat has a valve seat area and the diaphragm has a diaphragm area, and the valve seat area is 5-60% of the diaphragm area.

7. A degassing valve for a flexible container, the valve comprising:
   a generally flat valve seat on a truncated generally dome shaped structure, the valve seat raised a height above a valve chamber base surface and having a valve seat outer periphery;
   a resilient, flat, non-perforated diaphragm inter-engaged upon, but not mechanically held against, the valve seat and overlapping the valve seat outer periphery, the dome shaped structure having a sectional radius greater than the diaphragm radius, the diaphragm having a perimeter; such that the valve seat engages a central area of the diaphragm not proximate the perimeter of the diaphragm; and
   a well recessed a depth into the valve seat in a direction away from the diaphragm, the well being generally covered by the diaphragm when it is inter-engaged upon the valve seat, the depth of the well recess less than the height of the valve seat above the valve chamber base surface.

8. The degassing valve of claim 7 wherein the diaphragm is generally circular.

9. The degassing valve of claim 7 wherein the sectional radius of the dome shaped structure is 2.5-4 times the radius of the diaphragm.

* * * * *